United States Patent [19]  
Chabries

[11] Patent Number: 4,872,012  
[45] Date of Patent: Oct. 3, 1989

[54] DATA COMPRESSION METHOD AND APPARATUS FOR RADAR IMAGE FORMATION AND LIKE DATA PROCESSING OPERATIONS

[75] Inventor: Douglas M. Chabries, Salem, Utah

[73] Assignee: Brigham Young University, Provo, Utah

[21] Appl. No.: 234,274

[22] Filed: Aug. 19, 1988

[51] Int. Cl.$^4$ .............................................. G01S 13/89
[52] U.S. Cl. ..................................................... 342/25
[58] Field of Search .......................................... 342/25

[56] References Cited

U.S. PATENT DOCUMENTS

| 4,005,423 | 1/1977 | Webb | 342/25 |
|---|---|---|---|
| 4,132,989 | 1/1979 | Arens | 343/25 |
| 4,134,113 | 1/1979 | Powell | 342/25 |
| 4,170,006 | 10/1979 | Falk | 342/25 |
| 4,292,634 | 9/1981 | Wu et al. | 342/25 |
| 4,321,601 | 3/1982 | Richman | 342/25 |
| 4,471,357 | 9/1984 | Wu et al. | 342/25 |
| 4,564,839 | 1/1986 | Powell | 342/25 |
| 4,771,287 | 9/1988 | Mims | 342/25 |

OTHER PUBLICATIONS

The Effect of Codebook Size on the Vector Quantization of SAR Data, by R. V. Jones, V. D. Vaughn, R. L. Frost and D. M. Chabries.
Reduction of SAR Digital Processing Time Using Vector Quantization, by D. V. Arnold, D. M. Chabries and P. L. Jackson.
Quality Measures for SAR Images, by James E. Harris, Randall S. Ostler, Douglas M. Chabries and Richard W. Christiansen.
A Computation Compression Technique for SAR Based on Vector Quantization, by Christopher J. Read, David V. Arnold, Douglas M. Chabries and Richard W. Christiansen. (All above publications dated 1988).

Primary Examiner—Thomas H. Tarcza  
Assistant Examiner—John B. Sotomayor  
Attorney, Agent, or Firm—Thorpe, North & Western

[57] ABSTRACT

Synthetic aperture radar (SAR) images are formed by storing in electronic memory possible outputs of a lossy data compressor, $f_{1,1}[m]$, $f_{1,2}[m]$, ... $f_{1,P}[m]$, where $f_{1,i}[m]$ represents a segment of the unprocessed radar return; by storing range-correlated segments of the SAR data, $g_{1,1}[m]$, $g_{1,2}[m]$, ... $g_{1,P}[m]$, where $g_{1,i}[m]$ is the range-correlated version of $f_{1,i}[m]$; by storing all possible outputs of a second lossy data compressor, $f_{2,1}[n]$, $f_{2,2}[n]$, ... $f_{2,Q}[n]$, where $f_{2,i}[n]$ represents a segment of the range-correlated SAR image; and by storing segments of the range-azimuth focussed SAR image data, $g_{2,1,m}[n], g_{2,2,m}[n], \ldots g_{2,Q,m}[n]$, where $g_{2,i,m}[n]$ represents a segment of the SAR range-azimuth focussed image. Thereafter, a sequence of separate radar pulses are transmitted from an aircraft and the return signal is sampled and placed in an array. Vectors of the array are compared with segments $f_{1,i}[m]$, and the indices of the segments which most closely match the vectors are stored in an array. An intermediate image is formed by adding together segments, $g_{1,i}[m]$ whose indices match those in the array, while maintaining a predetermined offset. Vectors of this intermediate image are compared with segments $f_{2,i}[n]$ and the indices of these segments which most closely match the intermediate range vectors are stored in a second array. The final image is formed by adding together segments, $g_{2,i,m}[n]$, whose indices match those in the second array, while maintaining a predetermined offset between each segment during the addition.

3 Claims, 5 Drawing Sheets

Fig. 1A

Eq 1: $c(t) = a(t) e^{j[\omega_0 t + \dot{f} t^2]}$

| Variable | Name | X band (9.35 ghz carrier freq.) |
|---|---|---|
| T | Sample Period | 10 nsec |
| $\tau$ | Chirp Length | 2.7 usec |
| $\lambda$ | Wavelength | 3.2 cm |
| $\dot{f}$ | Chirp Rate | 33.3 MHz/usec |
| $r_0$ | Nearest Range | |
| $\Delta r$ | Range Resolution | 1.5m |
| $\Delta a$ | Azimuth Resolution | 1.44m |
| m | Range Index | 0-4095 |
| n | Azimuth Index | 0-∞ |

Fig. 1B

Eq 2: $h_2(n) = h_{2,m}(n) = \text{rect}\left\{ \dfrac{n}{\left[\dfrac{\lambda(r_0 + m\Delta r)}{2(\Delta a)^2}\right]} \right\} e^{\dfrac{j4\pi}{\lambda}\left[\sqrt{(r_0+m\Delta r)^2 + (n\Delta a)^2} - (r_0 + m\Delta r)\right]}$

Fig. 1C

Eq. 3: $h_1(m) = \text{rect}\left\{\dfrac{mT}{\tau}\right\} e^{-j \dot{f}(mT)^2}$

DATA COMPRESSION METHOD AND APPARATUS FOR RADAR IMAGE FORMATION AND LIKE DATA PROCESSING OPERATIONS

BACKGROUND OF THE INVENTION

This invention relates to improved methods and apparatus for forming multi-dimensional images from compressed sampled data, such as radar images in synthetic aperture radar systems.

Synthetic aperture radar (SAR) is a well-known technique for improving resolution in radar ground mapping. This is typically done by flying an airplane over the ground to be mapped, and successively transmitting a sequence of radar pulses. With the forward motion of the airplane, each successive radar pulse is transmitted from a position a little farther along on the flight path, thus simulating a very long radar array.

Return signals from the transmitted pulses are sampled in the airplane and either recorded aboard the airplane and brought back to a ground station for processing, or directly transmitted to the ground station for processing—to thereby develop the desired image. The processing carried out is complex, employing such techniques as fast fourier transform (FFT), inverse FFT or correlation. These operations require many floating-point multiplications, floating-point additions, floating-point subtractions and floating-point divisions, which can be carried out only by sophisticated processors.

In a co-pending application, Ser. No. 157,199, filed Feb. 17, 1988, a so-called "method of forming visual images in radar by utilizing preconvolved quantized vectors" is described in which sampled radar returns are represented as vectors. For example, samples of the return signal from one pulse are arranged in one row of an array, samples of the return signal from the next pulse are arranged in the next row of the array, etc. Groups of adjacent samples (source vectors) are compared to a set (codebook) of allowable vector patterns (codevectors) which have been previously determined to be statistically representative and stored. The codevectors all have assigned indices identifying them, and the index of the closest codevector to each source vector is either stored or transmitted to a receiver which also has a copy of the codebook. Such comparisons thus yield a small array of indices which identifies a larger array of source vectors. This process of "data compression" of the array of source vectors into a smaller array of indices is called vector quantization (VQ).

The array of indices is then used to identify and read from locations of a memory so-called preprocessed vectors which have indices corresponding to those in the array. These preprocessed vectors are convolved counterparts of codevectors identified by the indices. The identified preprocessed vectors are then added together in a predetermined fashion, while maintaining a certain offset between them, to obtain a result which determines the visual image of the radar returns (ground map). This preprocessing involves "focusing" the radar returns first in the range direction (called range compression) and then finally in the azimuth direction (called azimuth compression).

With the above-described process, computational and processing power is exchanged for larger memories to store the codebooks and preprocessed vectors. Savings are thus realized in computational hardware and time.

With the above method, the steps of range and azimuth focusing are performed in a single step to produce the preprocessed vectors. Since the azimuth focussing is a function of (dependent on) the range, low resolution images are obtained with the method. To obtain higher resolution images, the processing steps could be repeated for each of various ranges, but such an approach would eliminate the advantage realized by the method of reducing computational hardware and time.

It has been discovered with the present invention that even further significant savings can be realized in both computational hardware and memory requirements for SAR and like processing. This is accomplished by performing the steps of range focussing and azimuth focussing separately, i.e., storing two sets of preprocessed vectors, one for range focussing and one for azimuth focussing, and twice convolving and storing one-dimensional arrays (or a series of one-dimensional arrays) rather than a two-dimensional array.

SUMMARY OF THE INVENTION

It is an object of the invention to provide a less complex and time-consuming method and apparatus for forming visual SAR images and the like.

It is a further object of the invention to provide such a method and apparatus which, while reducing the computational requirements for forming such images, also conserves the amount of additional memory required.

It is still another object of the invention to provide such a method and apparatus which also provides high resolution while also reducing computational requirements.

The above and other objects of the invention are realized in a specific illustrative embodiment of a system and method in which high resolution SAR ground mapped images are formed as follows:

1. Storing in memory a codebook of codevectors $f_{1,i}[m]$ representing possible one-dimensional sampled data vectors of dimension $M \times 1$ of the radar returns of an SAR system;
2. Preprocessing row vectors for each of the possible code vectors $f_{1,i}[m]$ and storing the respective outputs $f_{1,i}[m] * h_1[m] = g_{1,i}[m]$ in memory, where * is the convolution operator and $h_1[m]$ is the range compression of a sampled data response function. (The $g_{1,i}[m]$ represent preprocessed range compressed SAR image segments and are stored in memory);
3. Storing in memory a codebook of code vectors $f_{2,i}[n]$ representing possible one-dimensional sampled data vectors of dimension $1 \times N$ of the range-focussed radar returns of an SAR system;
4. Preprocessing column vectors for each of the possible codevectors $f_{2,i}[n]$ and storing the respective outputs $f_{2,i}[n] * h_{2,m}[n] = g_{2,m,i}[n]$, where $h_{2,m}[n]$ is the azimuth compression portion of a sampled data response function (the $g_{2,m,i}[n]$ represent preprocessed SAR image segments and are stored in memory);
5. Transmitting a sequence of radar pulses from an airborne platform;
6. Receiving the radar return from the transmitted pulses, performing aircraft motion compensation and then sampling the compensated radar return and placing the samples into an array, $x[m,n]$ in memory;
7. Processing row blocked segments of the array $x[m,n]$ through a lossy data compressor to obtain an array of indices i[m], the size of the array i[m] being reduced by the data compressor, where i is the index of the codevector $f_{1,i}[m]$ which represents the ith row-blocked segment of x[m,n].

8. Reading from the memory the corresponding preprocessed vectors $g_{1,i}[m,n]$ whose indices i match the indices in the array of indices i[m];

9. Adding together the pre-processed vectors while maintaining an offset between each vector determined by the array dimensions of the codevectors $f_{1,i}[m]$ to form the range compressed SAR ground mapped image, and placing the addition resultants into an array z[m,n] in memory;.

10. Processing column blocked segments of the array z[m,n] through the lossy data compressor to obtain an array of indices i[n], the size of the array i[n] being reduced by the data compressor, where i is the index of the codevector $f_{2,i}[n]$ which represents the ith column-blocked segment of z[m,n].

11. Reading from the memory the corresponding pre-processed vectors $g_{2,m,i}[n]$ whose indices i match the indices in the array of indices i[n];

12. Adding together the pre-processed vectors while maintaining an offset between each vector determined by the array dimensions of the codevectors $f_{2,i}[n]$ to form a range and azimuth focused SAR ground mapped image.

Although the above method was described specifically for use with an SAR system, the method can be used with any system in which sampled data is to be compressed and subsequently utilized to form a multi-dimensional representation of the data. For example, geophysical mapping of the earth, two dimensional image recognition with machine intelligences, and processing in aids for the hearing impaired where the amplification is a function of both frequency and sound level, could also utilize the method of the present invention.

BRIEF DESCRIPTION OF THE DRAWINGS

Various features, details, and advantages of the present invention are described in the following detailed description presented in conjunction with the accompanying drawings wherein:

FIGS. 1A, 1B, and 1C give parameters and equations which define a typical synthetic aperture radar imaging system made in accordance with the principles of the present invention;

DETAILED DESCRIPTION

Figure 2:
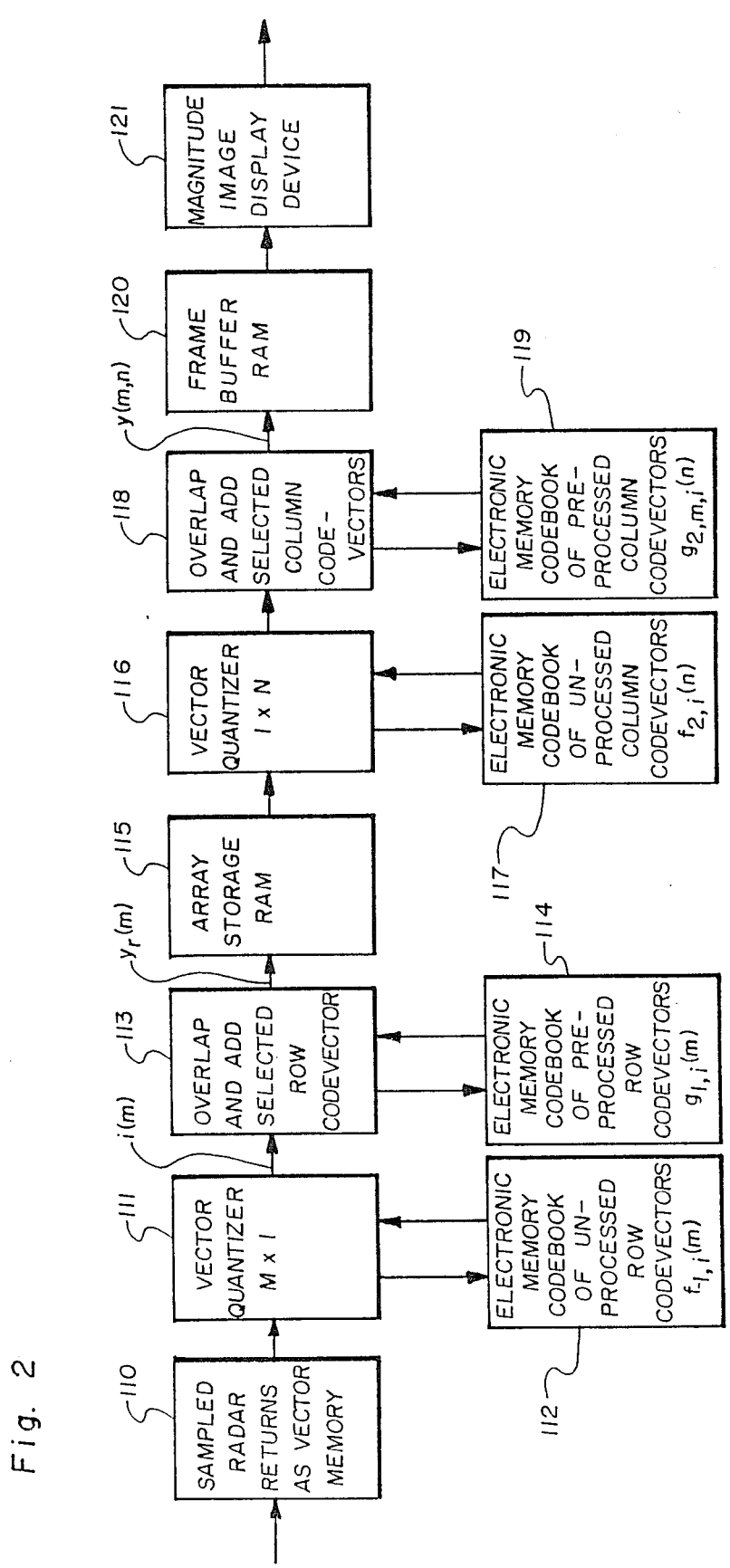
FIG. 2 shows an illustrative aperture radar imaging system made in accordance with the present invention.

A system is shown in FIG. 2 for forming visual SAR high resolution ground mapped images. Exemplary parameters for such a system are given in FIG. 1 and will become clear with a description of FIG. 2. Variation in the image formation process with location in the image will be required because of the spreading of the transmitted radar pulses as they propagate away from the aircraft. Such variation is manifest in Equation 2 of FIG. 1, where it is observed that $h_2[n]$ varies as a function of the range index m (the index n represents azimuth variation).

Figure 3:
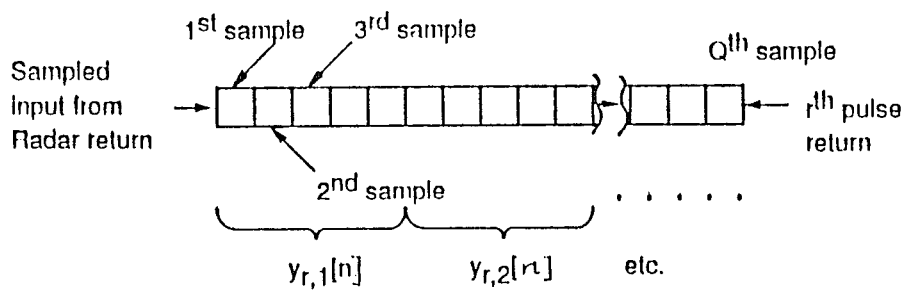
FIG. 3 details the first state of blocking for the system of FIG. 2.

In preparing the system of FIG. 1 for use, a finite set of I vectors (referred to as unprocessed codevectors), $f_{1,i}[m]$ (where "1" means first set of vectors and "i" means $i^{th}$ vector in the set), are selected which approximate as closely as possible the anticipated sampled radar pulse returns to be received following transmission of radar pulses and stored in a vector memory 110 (see FIG. 3 for details of the vector storage 110). The selected unprocessed codevectors are stored in electronic memory 112. The dimension of the unprocessed codevectors is $M \times 1$ and, while other values of M could be selected, a $5 \times 1$ array dimension is employed in the current embodiment to be described in FIG. 3. The process of selecting the codevectors is well known in prior art.

After selecting the codevectors, a set of "preprocessed" row codevectors $g_{1,i}[m]$ is generated through convolution with a sampled impulse response function $h_i[m]$ (see Equation 3 of FIG. 1) as $g_{1,1}[m]=f_{1,1}[m]*h_1[m], g_{1,2}[m]=f_{1,2}[m]*h_1[m], \ldots g_{1,I}[m]=f_{1,I}[m]*h_1[m]$. A function $h_1[m]$ of length two samples is selected for illustration in FIG. 4 to facilitate explanation of the overlap of $g_{1,i}[m]$; however, in the current embodiment the dimensionality of $h_1[m]$ is $K \times 1$ where K is 270 (in most applications, K, which is the number of range cells in the radar transmit pulse, is typically much larger than 30). As a result, the dimensionality of the preprocessed row codevectors, $g_{1,i}[m]$, is $[M+K-1] \times 1$, which for the example of FIG. 4 yields a $g_{1,i}[m]$ as an $(M=5)+(K=2)-1 \times 1$ or $6 \times 1$ codevector. The finite set of I preprocessed row codevectors are stored in memory 114.

Figure 5:
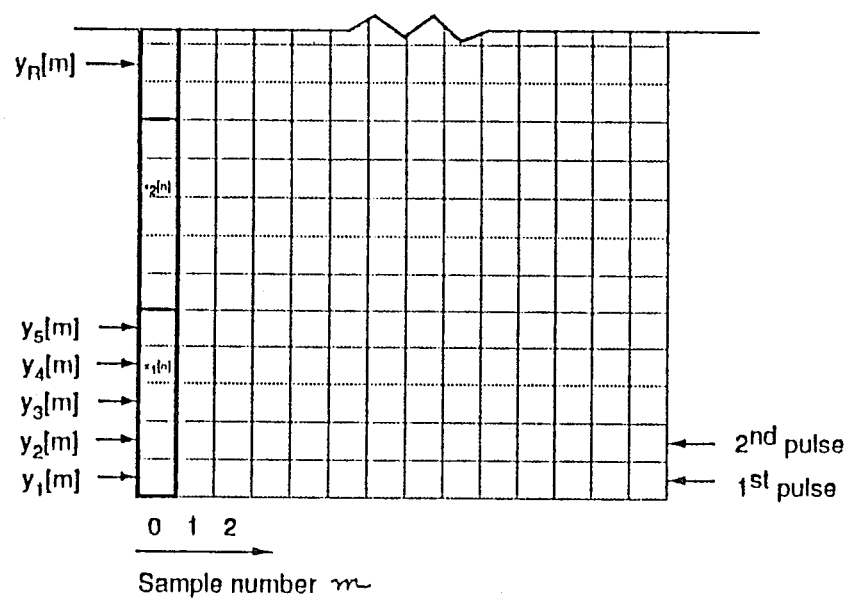
FIG. 5 defines the format of an intermediate array used in the processing of the system of FIG. 2.

Next, a finite set II of column vectors (referred to as unprocessed column codevectors, $f_{2,i}[n]$ are selected which approximate as closely as possible the anticipated column vectors to be stored in the array storage memory 115 (see FIG. 5 for details of the array storage 115 and the generation of column vectors $x_s[n]$, the said selected unprocessed column codevectors $f_{2,1}[n]$ are stored in memory 117. In the device described in FIG. 2, the dimension of the unprocessed column codevectors in $1 \times N$ and, while other values of N could be selected, a $1 \times 5$ array dimension is employed to illustrate the current embodiment as shown in FIG. 5. The process of selecting the column codevectors is well known as previously mentioned. A set of preprocessed column codevectors $g_{2,i,m}[n]$ is next generated through convolution with a sampled data response function $h_{2,m}[n]$ as $g_{2,1,m}[n]=f_{2,1}[n]*h_{2,m}[n], g_{2,2,m}[n]=f_{2,2}[n]*h_{2,m}[n], \ldots g_{2,I,m}[n]=f_{2,I}[n]*h_{2,m}[n]$. Since the sampled data response $h_{2,m}[n]$ (see Equation 2 FIG. 1) varies slowly with m, only every Jth column index m need be calculated and stored, thereby significantly reducing the memory storage requirement. To emphasize this fact, the variable m in $h_{2,m}[n]$ and $g_{2,i,m}[n]$ will be replaced by j. For a typical X band SAR imaging system, the same value for m may be used over a range of 20 or more columns. A convolution function with two samples was used for $h_{2,j}[n]$ to demonstrate the overlap of $g_{2,i,j}[n]$ in FIG. 6 to facilitate explanation of the invention; however, in the current embodiment the dimensionality of $h_{2,m}[n]$ is $1 \times L$ where L is 40 (L, which is the number of azimuth cells in the transmit pulse, is typically much larger than 30). As a result, the dimensionality of the preprocessed column codevectors, $g_{2,i,j}[n]$ is $1\times[N+L-1]$, which for the example of FIG. 6 yields a $g_{2,i,j}[n]$ as a $1\times[(N=5)+(L=2)-1]$ or $1\times 6$ codevector. The finite set of II preprocessed column codevectors are stored in electronic memory 119.

Forming and storing the codevectors is performed only one time before beginning any SAR image formation processing. After this is completed, the system of FIG. 2 may be operated to obtain a high resolution SAR image, as will next be described in conjunction with FIGS. 2-6.

To begin, a sequence of radar pulses is transmitted from an airborne platform at periodic intervals. The radar return pulses are motion compensated to account for deviation of the aircraft from the predetermined trajectory and sampled multiple times, as is well known and described in the aforecited copending patent application. These samples are arranged in a vector memory 110, as further shown in FIG. 3, so that the samples of the return signal from one pulse make up one row, etc.

Once sufficient samples are stored in vector memory 110, blocks $y_{r,s}[m]$ of the vector $y_r[m]$ are constructed which correspond in size to the unprocessed codevectors $f_{1,i}[m]$. These vectors, $y_{r,s}[m]$, are supplied to the vector quantizer 111 which compares the vectors with the unprocessed row codevectors $f_{1,i}[m]$ stored in memory 112 and supplies an index i to the overlap and add module 113. The supplied index i identifies the codevector in memory 112 which most closely matches the vector $y_{r,s}[m]$.

Figure 4:
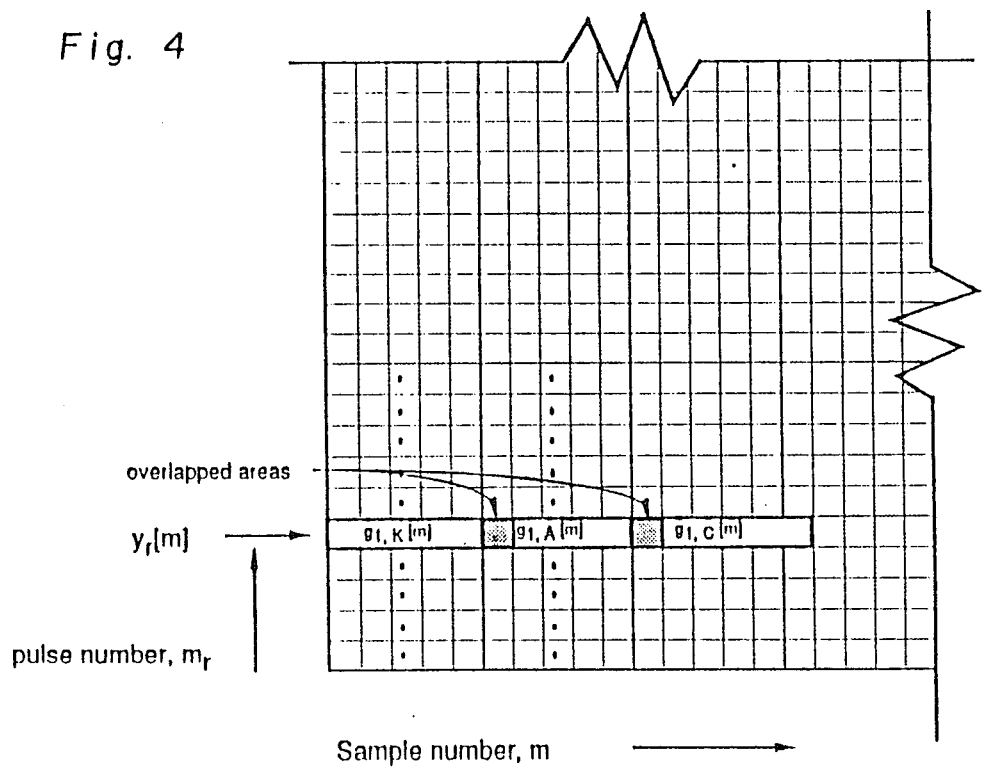
FIG. 4 shows the overlap and add technique modified for the system of FIG. 2.

The module 113 performs an overlap and add operation on the ith preprocessed row codevector (see FIG. 4) retrieved from the memory 114. Subsequent indices i[m] are likewise supplied and the corresponding preprocessed row codevectors are selected from the memory 114 and added to the vector $y_r[m]$ at intervals of M samples in the range or horizontal direction as shown in FIG. 4. This may be represented mathematically as $$\overline{y_r}[m] = \sum_{p=1}^{P} g_{1,i[p]}[m + pM - M]$$

where P is the number of samples in the range dimension of the array $x[m,n]$, and the i[p] are supplied sequentially for $p=1$ to P by module 111. After the return for the rth radar pulse is thusly processed, it is identified as $y_r[m]$ and stored in an array storage memory 115. The data stored in this array represents the radar return sampled input sequence for SAR convolved only with $h_1[m]$. Those skilled in SAR refer to this data array as the range-correlated focused image—azimuth focusing remains to be accomplished.

Next, the data in the array storage 115 is blocked into column vectors as shown in FIG. 5. As before, the column vectors $x_s[n]$ are supplied to a vector quantizer 116. The process of vector quantization is repeated by choosing the unprocessed column codevector $f_{2,i}[n]$ stored in memory 117 which best matches the vector $x_p[n]$ and the index of such codevector is supplied to another overlap and add module 118. Additionally, the column number, m, is supplied to the overlap and add module 118.

Figure 6:
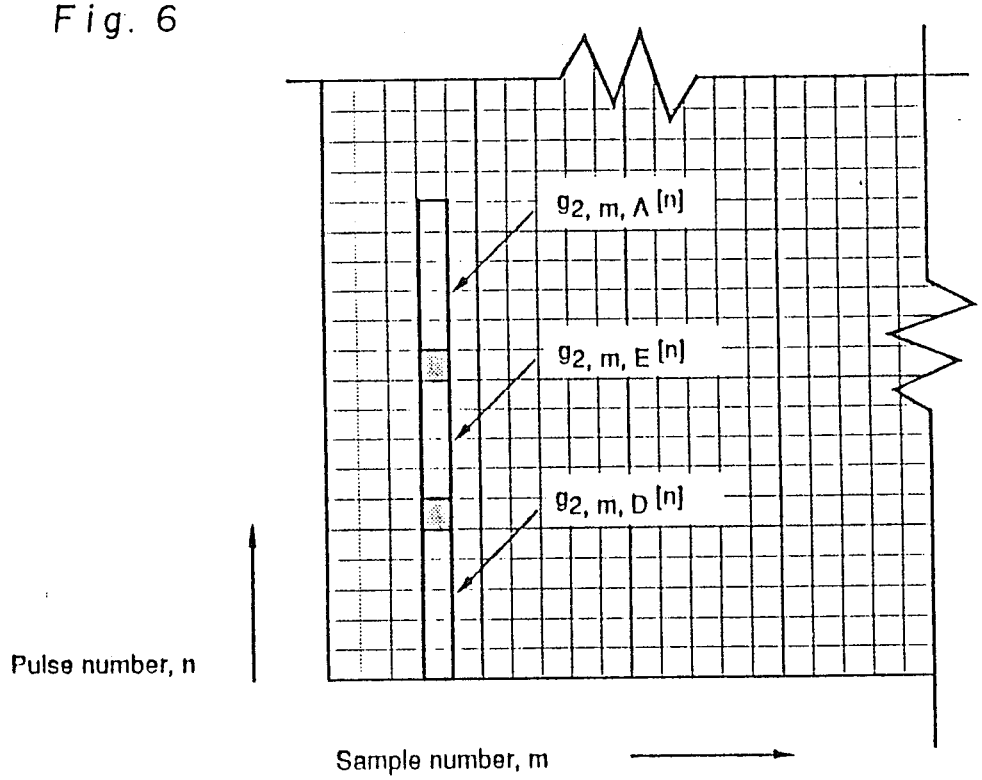
FIG. 6 illustrates the final stage of an overlap and add procedure used in the system of FIG. 2.

Respective processed column codevectors, $g_{2,i,j}[n]$ identified by the indices are selected from memory 119; the index subscript j is updated each time the column number is increased by an integer number multiplied by J (J is chosen to be 20 in the preferred embodiment, but other values of J may be selected according to the desired focussing); and the vectors $g_{2,i,j}[n]$ are overlapped with an offset N samples and added as shown in FIG. 6 to form $y[m,n]$, representing the fully focussed visual image. This may be represented mathematically as $$y[m,n] = \sum_{q=1}^{Q} g_{2,i[q],m[modulo\ J]}[n + qN - N]$$

Where Q is the number of samples in the azimuth dimension of the array $y[m,n]$, and the i[q] are supplied sequentially for $q=1$ to Q by the module 116. Starting at $m=1$, after each set of Q indices is received, m is incremented by 1 until the value P is reached. Thereafter, the process may be restarted for the next image. Values for each of the array points $y[m,n]$ are stored in the frame buffer memory 120.

As a final step, the magnitude of each array location is displayed on an image display device 121 to form the desired image.

The modules of FIG. 2 are conventional hardware. For example, modules 111 and 116 might illustratively be vector quantizer microelectronic chips or microprocessors with memory, modules 113 and 118 might illustratively be microprocessors, and modules 110, 112, 114, 15, 117, 119 and 120 might illustratively be electronic memories of the type indicated in FIG. 2.

A preferred method for forming high resolution SAR ground mapped images in accordance with the invention, as well as an electronic system for performing the method has been described in detail. The invention produces SAR ground mapped images with significantly reduced complexity and without requiring multiplication in the image formation process. The preferred embodiment of the invention also requires significantly less memory and less computation for overlap operations than previously required due to the fact that $M\times 1$ and $1\times N$ codevectors are stored in place of two-dimensional codevectors $f[m,n]$.

Many changes and modifications can be made to the details of the embodiment without departing from the nature and spirit of the invention. Accordingly, it is to be understood that the invention is not limited to the above details but is defined by the appended claims. Further obvious applications and modifications of the invention are intended by this disclosure which include but are not limited to such areas as: the processing of geophysical seismic data; processing of data using artificial intelligence image recognition techniques; and automated sonar signal processing of spectrogram displays.

What is claimed is:

1. A method of forming high resolution visual radar images including the steps of:

storing in memory a finite set of codevectors $f_{1,1}[m]$, $f_{1,2}[m]$, ... $f_{1,p}[m]$ with respective indices, where $f_{1,i}[m]$ represents a preselected possible segment of an unprocessed radar return;

storing in memory a finite set of preprocessed segments $g_{1,1}[m]$, $g_{1,2}[m]$, ... $g_{1,p}[m]$ with respective indices, where $g_{1,i}[m]$ is the range-correlated version of $f_{1,i}[m]$, equalling $f_{1,i}[m]*h_1[m]$, $h_1[m]$ is the range compression portion of a sampled data response function, and * is a convolution operator;

storing in memory in an array a finite set of codevectors $f_{2,1}[n]$, $f_{2,2}[n]$, ... $f_{2,q}[n]$ with respective indices, where $f_{2,i}[n]$ represents a preselected possible segment of a range-correlated unprocessed radar return;

storing in memory a finite set of preprocessed segments $g_{2,1,m}[n]$, $g_{2,2,m}[n]$, ... $g_{2,q,m}[n]$ with respective indices, where $g_{2,i,m}[n]$ is the range/azimuth-focused version of $f_{2,i}[n]$ for the mth column of the array of $f_{2,i}[n]$ equalling $f_{2,i}[n]*h_{2,m}[n]$, and $h_{2,m}[n]$ is the azimuth compressed portion of a sampled data response function;

transmitting a sequence of separate radar pulses from an airborne object;

sampling a return signal from the transmitted pulses and ordering the samples in an array, comparing segments of the sample array with the codevectors $f_{1,i}[m]$ and storing in memory an array of indices of the codevectors which most closely fit the compared sample array segments;

retrieving from memory the range-correlated segments $g_{1,i}[m]$ whose indices match the indices in tee array of indices, forming an intermediate range-compressed image by adding together the retrieved range-correlated segments while maintaining a predetermined offset between them as they are added, and storing the resultant intermediate image vectors, comparing the resultant intermediate image vectors with the codevectors $f_{2,i}[m]$ and storing in memory a second array of indices of the codevectors which most closely fit the compared intermediate image vectors, retrieving from memory the range/azimuth-focussed segments $g_{2,i,m}[n]$ whose indices match the indices in the second array of indices, adding together the retrieved range/azimuth-focussed segments while maintaining a predetermined offset between them as they are added, and storing the resultant image defining vectors, and producing a visual radar image from the image defining vectors.

2. A system for forming high resolution visual images from sampled radar returns of synthetic aperture radar apparatus, said system comprising an electronic memory which stores a set of possible radar return segments $f_{1,i}[m]$ which are vectors of dimension $M \times 1$;

an electronic memory which stores a set of partially preprocessed vectors $g_{1,i}[m]$ which represent the range-correlated versions of the respective vectors $f_{1,i}[m]$;

an electronic memory which stores a set of possible radar return segments $f_{2,i}[m]$ partially processed in only the range dimension, where $f_{2,i}[m]$ are vectors of dimension $1 \times N$;

an electronic memory which stores a set of preprocessed vectors $g_{2,i}[n]$ which represent the azimuth-correlated versions of the respective vectors $f_{2,i}[n]$;

means for comparing segments of sampled radar returns with the vectors $f_{1,i}[m]$ and storing indices of the vectors which most closely approximate the segments of the sampled radar returns;

means for adding together vectors $g_{1,i}[m]$ whose indices match the stored indices, while maintaining an offset between each of the vectors;

means for storing the resultants of the added vectors to thereby form an intermediate, range-correlated image array;

means for comparing said resultants with the vectors $f_{2,i}[m]$ and storing a second set of indices of the vectors $f_{2,i}[m]$ which most closely approximate said resultants;

second means for adding together vectors $g_{2,i}[n]$ whose indices match the second set of stored indices, while maintaining an offset between each of the vectors;

means for storing second resultants of the added vectors by the second adding means;

means for displaying a radar image defined by said second resultants.

3. A system for processing multi-dimensional data to obtain an information defining array including the steps of:

(a) storing in electronic memory a finite set of vectors which are possible outputs of a lossy data compressor, $f_{1,1}[m]$, $f_{1,2}[m]$, ... $f_{1,r}[m]$, where $f_{1,i}[m]$ represents a segment of the unprocessed input scanned in one dimension;

(b) storing a finite set of segments of the data processed in only said one dimension, $g_{1,1}[m]$, $g_{1,2}[m]$, ... $g_{1,p}[m]$, where $g_{1,i}[m]$ is the pre-processed version of $f_{1,i}[m]$;

(c) repeating the step (a) for each of N dimensions by storing a finite set of vectors $f_{p,i}[n]$ which represent all possible outputs of the Nth lossy data compressor, $f_{N,1}[n]$, $f_{N,2}[n]$, ... $f_{N,Q}[n]$, where $f_{N,i}[n]$ represents a one-dimensionally ordered segment in the Nth dimension);

(d) repeating the step (b) for each of N dimensions by storing a finite set of segments of the data processed in the Nth dimension, $g_{N,1}[n]$, $g_{N,2}[n]$, ... $g_{N,r}[n]$ where $g_{N,i}[n]$ is the preprocessed version of $f_{N,i}[n]$ processed in only the Nth dimension;

(e) sampling a data signal and placing the samples into a multi-dimensional array;

(f) comparing segments of the array with possible outputs of a loosy data compressor which operates only on the first dimension $f_{1,i}[m]$, and storing an array of indices of the possible outputs which most closely match the compared segments of the array;

(g) forming an intermediate array of vectors which result from adding together the segments, $g_{1,i}[8\ m]$, whose indices match the indices in the array of indices, while maintaining an offset equal to the longest dimension of the segment $f_{1,i}[m]$;

(h) comparing the intermediate array of vectors with other possible outputs of a lossy data compressor which operates on another dimension $f_{p,1}[n]$, and storing another array of indices of the other possible outputs which most closely match the compared intermediate array of vectors, (i) forming an array of other vectors which result from adding together the segments $g_{p,i}[n]$, whose indices match the indices in said another array of indices, while maintaining an offset equal to the longest dimension of the vector $f_{p,i}[n]$;

(j) storing the array formed in step (i) into the intermediate array of step (h); and (k) repeating steps (h) through (j) for the remainder of the N dimensions such that the last array formed is the final array which defines the desired information.

* * * * *